(12) United States Patent
Takashima et al.

(10) Patent No.: US 11,635,614 B2
(45) Date of Patent: Apr. 25, 2023

(54) SYSTEMS AND METHODS FOR BEAM STEERING USING A MICROMIRROR DEVICE

(71) Applicant: Arizona Board of Regents on Behalf of the University of Arizona, Tucson, AZ (US)

(72) Inventors: Yuzuru Takashima, Tucson, AZ (US); Braden Smith, Tucson, AZ (US); Brandon Hellman, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 818 days.

(21) Appl. No.: 16/604,763

(22) PCT Filed: Apr. 13, 2018

(86) PCT No.: PCT/US2018/027508
§ 371 (c)(1),
(2) Date: Oct. 11, 2019

(87) PCT Pub. No.: WO2018/191630
PCT Pub. Date: Oct. 18, 2018

(65) Prior Publication Data
US 2020/0379250 A1 Dec. 3, 2020

Related U.S. Application Data

(60) Provisional application No. 62/485,554, filed on Apr. 14, 2017.

(51) Int. Cl.
*G02B 26/10* (2006.01)
*G01S 7/481* (2006.01)
*G02B 26/08* (2006.01)

(52) U.S. Cl.
CPC ............ *G02B 26/10* (2013.01); *G01S 7/4815* (2013.01); *G01S 7/4817* (2013.01); *G02B 26/0833* (2013.01)

(58) Field of Classification Search
CPC ...... H04N 9/31–3197; G01S 17/00–95; G01S 7/00–64
See application file for complete search history.

(56) References Cited

U.S. PATENT DOCUMENTS 6,707,591 B2   3/2004   Amm
7,459,333 B2   12/2008  Richards et al.
(Continued)

FOREIGN PATENT DOCUMENTS

WO   2017115076   7/2017
WO   2017115081   7/2017
(Continued)

OTHER PUBLICATIONS

International Search Report and Written Opinion for International Application No. PCT/US18/27508 dated Jul. 9, 2018; 9 pages.
(Continued)

*Primary Examiner* — Bao-Luan Q Le
*Assistant Examiner* — Christopher A Lamb, II
(74) *Attorney, Agent, or Firm* — George McGuire

(57) ABSTRACT

A beam steering apparatus including a first actuatable micromirror array (AMA) having a pitch, p, adapted to impart a modulation to a wavefront incident on the first AMA by a transition between a first state and a second state, wherein the first AMA has a transition time (T) between the first state and the second state, and at least one light source adapted to provide the incident wavefront having a duration, t, to the first AMA, where t≤T. The AMA may be a MEMS device such as a digital micromirror array. The beam steering apparatus may constitute a portion of LIDAR system.

17 Claims, 7 Drawing Sheets

(56) References Cited

U.S. PATENT DOCUMENTS

| | | | |
|---|---|---|---|
| 8,660,154 B1 | 2/2014 | Strong | |
| 2001/0010536 A1 | 8/2001 | Katzir et al. | |
| 2002/0079432 A1* | 6/2002 | Lee | G02B 5/1828 |
| | | | 250/216 |
| 2002/0122595 A1 | 9/2002 | Crill | |
| 2003/0112507 A1* | 6/2003 | Divelbiss | H04N 13/365 |
| | | | 348/E13.058 |
| 2004/0080938 A1 | 4/2004 | Holman et al. | |
| 2005/0243439 A1 | 11/2005 | Tomita et al. | |
| 2009/0021456 A1* | 1/2009 | Deppe | G09G 3/002 |
| | | | 345/77 |
| 2010/0014136 A1 | 1/2010 | Haussler et al. | |
| 2010/0053711 A1 | 3/2010 | Haussler | |
| 2010/0157399 A1 | 6/2010 | Kroll et al. | |
| 2010/0296148 A1 | 11/2010 | Reichelt et al. | |
| 2011/0074983 A1 | 3/2011 | Bush | |
| 2011/0181864 A1* | 7/2011 | Schmitt | G01S 17/95 |
| | | | 356/28 |
| 2011/0261094 A1 | 10/2011 | Ruckmongathan | |
| 2012/0038892 A1 | 2/2012 | Kurtz et al. | |
| 2012/0038903 A1 | 2/2012 | Weimer et al. | |
| 2013/0182239 A1 | 7/2013 | Kaiser et al. | |
| 2014/0240514 A1 | 8/2014 | Love et al. | |
| 2015/0268479 A1 | 9/2015 | Woodgate et al. | |
| 2016/0033642 A1 | 2/2016 | Fluckiger | |
| 2016/0033757 A1 | 4/2016 | Kurtz et al. | |
| 2016/0313695 A1 | 10/2016 | Futterer | |
| 2017/0003392 A1 | 1/2017 | Bartlett et al. | |
| 2017/0018214 A1 | 1/2017 | Black et al. | |
| 2017/0018215 A1 | 1/2017 | Black et al. | |
| 2017/0034486 A1* | 2/2017 | Richards | H04N 9/3126 |

FOREIGN PATENT DOCUMENTS

| | | |
|---|---|---|
| WO | 2018191694 | 10/2018 |
| WO | 2018191696 | 10/2018 |

OTHER PUBLICATIONS

Gittard, Shaun D., "Fabrication of microscale medical devices by two-photon polymerization with multiple foci via a spatial light modulator", Oct. 26, 2011, Biomedical Optics Express, vol. 2, No. 11, pp. 3167-3178.

Ozdemir, Aytekin, et al., "Analysis of the focusing crosstalk effects of broadband all-dielectric planar metasurface microlens arrays for ultra-compact optical device applications", Sep. 27, 2018, OSA Continuum, vol. 1, No. 2, pp. 506-520.

* cited by examiner

SYSTEMS AND METHODS FOR BEAM STEERING USING A MICROMIRROR DEVICE

RELATED APPLICATION

The present application is a national stage application under 35 U.S.C. 371 based on international patent application PCT/US18/27508 filed on Apr. 13, 2018, which relates and claims priority to U.S. Provisional Application No. 62/485,554 filed on Apr. 14, 2017 having a title SYSTEMS AND METHODS FOR BEAM STEERING USING A MICROMIRROR DEVICE under 35 U.S.C. § 119(e), the substance of each of said applications is hereby incorporated by reference in its entirety.

FIELD

Beam steering, and in particular beam steering using a micromirror device.

BACKGROUND

Beam steering technology is useful for Light Detection and Ranging (LIDAR) systems. For this reason, beam steering technologies have been actively researched. Along with mechanical and completely non-mechanical beam steering, Micro-Electro-Mechanical-Systems (MEMS) are one of the emerging beam steering fields that are especially applicable to LIDAR.

Mechanical scanning including gimbals, fast-steering mirrors, Risley prisms, rotating polygon mirrors and gratings have been used for wide wavelength ranges. Although mechanical beam scanning modalities are widely adopted, systems having fewer or no moving parts and smaller component inertia are desired for fast and compact beam steering devices. Such apparatuses reduce size, weight, cost, and power consumption. This is especially desirable for autonomous vehicle and robotics market sector applications.

In terms of small component inertia, Micro-Electro-Mechanical Systems (MEMS) are promising due to their small size and weight, low production cost, high energy efficiency, and applicability to wide wavelength ranges. These MEMS devices include single resonant mirrors and shifting lenslet arrays. However, for LIDAR applications, a large steering angle as well as large beam size is needed to cover a large angle of scanning and minimize beam divergence due to diffraction.

Resonant mirrors and shifting lenslet arrays are limited in angular range and maximum accommodated beam size. Current high-end resonant mirror MEMS scanning systems have moderate fields of view (e.g., 36° and scan rates of 21 kHz). Options to improve this performance are limited. For example, a resonant mirror's maximum beam diameter is only increased at the expense of the decreased maximum scan rate; and although optical amplification of the steering angle by use of an inverse telescope design has been reported, such improvement in steering angle requires a reduction in the beam diameter to conserve the Lagrange invariant in the optical system. Thus effective delivery of light is limited at distances over 100 m due to beam spreading by diffraction.

SUMMARY

It is typically desirable that a beam steering system for use in LIDAR have a relatively large beam size, a relatively wide field of view and relatively high scan rate while minimizing the number of moving parts. As described herein, according to aspects of the present invention, these goals may be satisfied using a beam steering apparatus that employs an Actuatable Mirror Array (AMA) (e.g., a Digital Micromirror Device (DMD)) with light source(s) configured and arranged to project relatively short pulses of light onto the AMA. In some embodiments, the beam steering is achieved by "freezing" the micromirror movement using a pulse of light that is short relative to the activation time (i.e., the time between a first state of tilt and a second state of tilt) of the mirrors of an AMA. It will be appreciated that such a configuration may be used to form a programmable blazed grating. In some embodiments, the AMA is used to achieve a LIDAR system with a relatively large field of view, a relatively high scan rate and a relatively large beam size. Although embodiments of a beam steering device are described below with reference to a LIDAR system, beam steering devices have many applications, which are within the scope of aspects of the present invention.

For example, a light source may be a sub-microsecond pulsed light source, a collimated laser beam, a focused laser beam, or a quasi-collimated beam, e.g., from a light emitting diode.

The term "Digital Micromirror Device" is commonly used to describe a mirror having 2 or 3 discrete states of operation (e.g., an ON position and an OFF position). As described herein, such an apparatus is used to achieve 2 or more states of operation as determined by the timing of light projected onto the DMD. It is to be understood that the term Digital (as used in the term Digital Micromirror Device or DMD) is not meant to be limiting of an actuatable mirror's construction (i.e., it is not limited to devices able to achieve only a selected number of discrete states); and the use of a DMD in examples herein is only by way of example, and any actuatable micromirror array (AMA) of any suitable construction to achieve operation as described herein, including but not limited to conventional DMDs having only 2 or 3 discrete states may be used.

These and other aspects of the present invention will become apparent upon a review of the following detailed description and the claims appended thereto.

An aspect of the invention is directed to a beam steering apparatus, comprising a first actuatable micromirror array (AMA) having a pitch, p, adapted to impart a modulation to a wavefront incident on the first AMA by a transition between a first state and a second state, wherein the first AMA has a transition time (T) between the first state and the second state, and at least one light source adapted to provide the incident wavefront having a duration, tmax, to the first AMA, where tmax<T.

In some embodiments, the first state and second state are discrete ON and OFF states, respectively.

The at least one light source may comprise a laser. The at least one light source may comprise a plurality of laser diodes. The at least one light source may comprise a plurality of light sources producing, at least two of the light sources producing different wavelengths than one another. The incident wavefront may be planar. The at least one light source may be adapted to produce collimated light.

The first AMA may be configured to have only 2 discrete states of operation.

The beam steering apparatus may further comprise a second AMA cascaded with the first AMA. The second AMA is positioned to receive light from the incident wavefront after the incident wavefront is incident on the first AMA.

Another aspect of the invention is directed to a method for making an effective blazed grating, comprising actuating an actuatable micromirror array (AMA) between a first state and a second state, wherein the AMA has a transition time, T, between the first state and the second state, and directing a wavefront onto the AMA, the wavefront having a duration tmax, where tmax<T.

Another aspect of the invention is directed to a LIDAR system for detecting an object, comprising a first actuatable micromirror array (AMA) having a pitch, p, adapted to impart a modulation to a wavefront incident on the first AMA during a transition between a first state and a second state, wherein the first AMA has a transition time (T) between the first state and the second state, at least one light source adapted to provide the incident wavefront having a maximum duration (tmax) to the first AMA where tmax<T, and a detector positioned to receive light from the wavefront after it is directed onto and reflected by the object.

DETAILED DESCRIPTION

Aspects of the present invention will be further illustrated with reference to the following specific examples. It is understood that these examples are given by way of illustration and are not meant to limit the disclosure or the claims to follow to any particular example.

Figure 1:
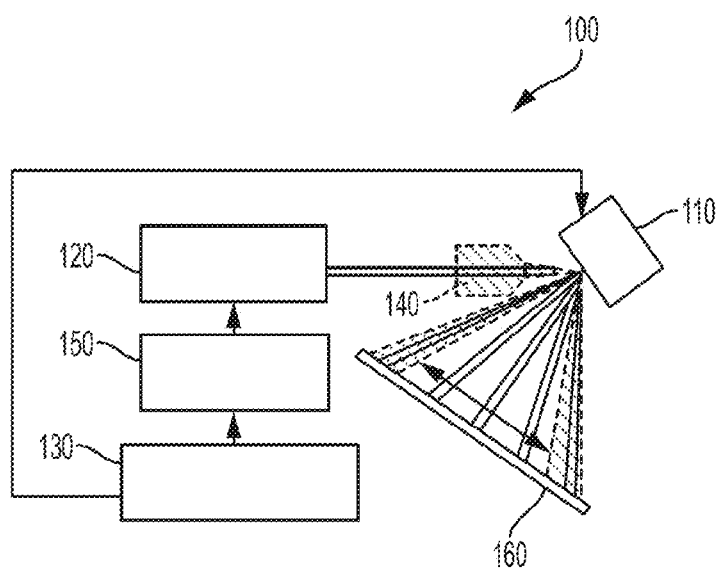
FIG. 1 is a schematic illustration of an example of a beam steering apparatus according to aspects of the present invention.

FIG. 1 is a schematic illustration of an example of a beam steering apparatus 100 according to aspects of the present invention. Beam steering apparatus 100 comprises a digital micromirror device (DMD) 110, a light source 120, and a processor 130. As described below, apparatus 100 may include a collimating or focusing lens 140 and/or a delay 150.

DMD 110 has micromirror elements (also referred to as micromirrors) having a pitch, p, adapted to impart a modulation to a wavefront incident on the DMD during a transition between a first state and a second state, wherein the DMD has a transition time, T, between the first state and second state. In some embodiments, the first state and the second state correspond to an ON state and an OFF state of a conventional DMD, respectively.

Figure 2A:
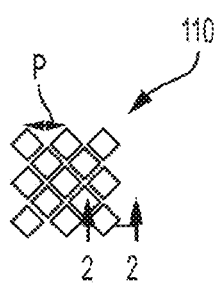
FIG. 2A is a schematic illustration showing further details of an example DMD suitable for use in the present invention.
Figure 2B:
FIGS. 2B-2D show the DMD of FIG. 2A in various states of operation.
Figure 2C:
Figure 2D:

FIG. 2A is a schematic illustration showing further details of an example DMD suitable for use in the present invention. For example, the DMD may comprise a 608×684 array (horizontal by vertical) of micromirrors such as part DLP3000 available from Texas Instruments of Dallas, Tex. As shown in FIG. 2A, the micromirrors may be positioned in a diamond configuration with a pitch of 10.8 μm. In DMD 110, the micromirrors flip between an ON state (shown in FIG. 2B as a viewed along section line 2-2 in FIG. 2A) and OFF state (shown in FIG. 2D as a viewed along section line 2-2 in FIG. 2A) by rotating +/−12° about an axis defined relative to a normal of a micromirror. FIG. 2C shows the DMD in a non-operational "parked" state. It is to be appreciated that, in the illustrated embodiment, a DMD (e.g., DMD 110) is designed for binary spatial light modulation and is not intended to be used for angular beam steering as described herein.

In some embodiments, DMD mirrors move continuously between the ON and OFF states with a typical transition time on the order of a few micro seconds. According to some aspects of the invention, a heretofore unused transitional state of the DMD is utilized by projecting a short pulsed laser whose pulse duration is much shorter than the transition time of the mirrors. With the short pulsed laser, micromirror movement can be "frozen" at a plurality of angles between the stationary ON and OFF states. Thus it is feasible to form a programmable blazed diffraction grating to discretely steer a collimated beam (e.g., a laser beam). It is to be appreciated that more than one pulse of light may be incident on a DMD during a single transition between the ON and OFF states, the pulsed occurring at different times than one another. The multiple pulses have the effect of freezing the mirrors at multiple blaze angles at the different times during a single transition.

As described in greater detail below, it is also feasible to create a continuously scanned beam if the laser beam is projected onto a single DMD mirror thereby avoiding the diffraction grating effects caused by using multiple micromirrors to direct a single beam.

Figure 3A:
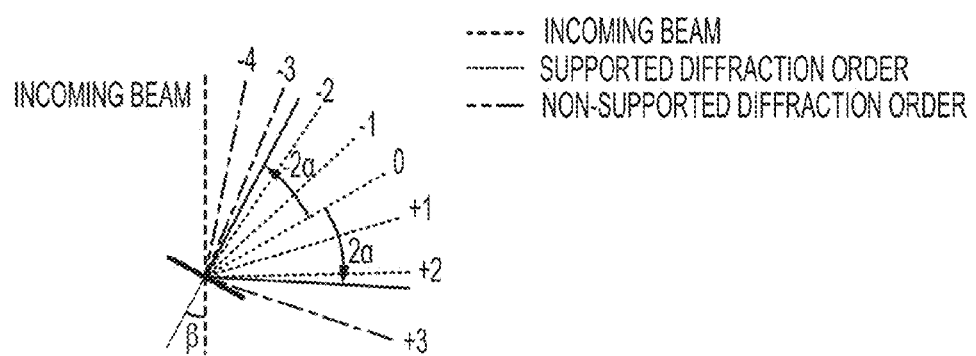
FIG. 3A shows an incoming beam of light incident on an array of mirrors of an actuatable mirror array generating a diffraction pattern having various orders.

As shown in FIG. 3A, an incoming beam of light incident on an array of mirrors as shown in FIG. 2A will generate a diffraction pattern having various orders (e.g., −4, −3, −2, −1, 0, 1, 2, 3, 4).

Figure 3B:
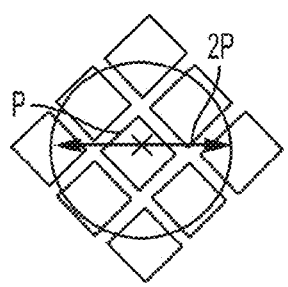
FIG. 3B shows a DMD having a beam of a beam diameter D greater than the DMD pitch size p.

As shown in FIG. 3B, for the DMD to effectively diffract light in a beam, it is typically desirable that the beam diameter be at least equal to two-times the pitch size p. In some embodiments, it is preferable that the beam diameter be at least three times the pitch size p. A group of mirrors positioned to direct a given beam are referred to herein as a pixel of the DMD.

The diffraction orders generated by projecting a beam onto an array of micromirrors in a manner as described above are defined by the following diffraction grating equation (1):

$$p \sin \theta_m = 2m\lambda \qquad (1)$$

where $\theta_m$ is the angle from the zeroth order to the mth order shown in FIG. 3A, p is the mirror pitch (width), $\lambda$ is the wavelength of light in the beam, and the factor of 2 is due to the diamond micromirror orientation of the illustrated embodiment. Eqn. (1) as set forth above is for instances where the angle of incidence of incoming light is normal to the mirror array surfaces. Mirror arrays according to aspects of the present invention may be operated with light projected at any angle with appropriate mathematical consideration.

Figure 3C:
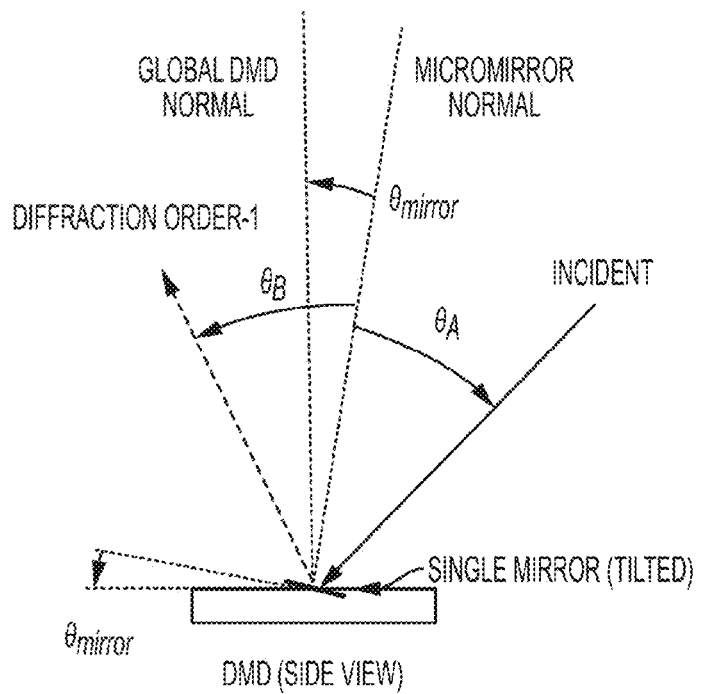
FIG. 3C illustrates that, by tilting the mirrors of a mirror array such that the mirror normals form an angle $\Theta_{mirror}$ relative to the DMD normal angle, light can be selectively directed into a given order.

As shown in FIG. 3C, by tilting the mirrors such that the mirror normal forms an angle $\theta_{mirror}$ relative to the DMD normal angle, light can be selectively directed into a given order (e.g., order −1). For example, to efficiently direct light into order −1, the mirrors are angled such that $\theta_A = \theta_B$. In some diffractive embodiments, light is diffracted by the DMD into one of the specific diffraction orders with diffraction efficiencies close to 100% since the frozen state of the tilted DMD mirrors is equivalent to a blazed grating where the slope of the mirror is set to the blaze angle.

It will be appreciated that, although the illustrated embodiment has a diamond any suitable orientation may be used. Additionally, mirrors of any suitable shape may be used (e.g., square or rectangle). It will be appreciated that other mirror array shapes and orientations are governed by an equation similar to equation (1), but modified to account for the configuration of the mirror array.

Light source 110 is adapted to provide the incident wavefront in pulses of light having a maximum duration, $t_{max}$, to the DMD, where $t_{max} \leq T$. Light source 110 may be collimated or uncollimated, coherent or quasi-coherent, monochromatic or quasi-monochromatic. For example, light source 120 may be a laser with or without a collimating lens or an LED with or without a collimating lens. For example, $T/t_{max}$ may be equal to or greater than any of 50, 100, 250.

It will be appreciated that a plane wave of short duration ($t_{max} \leq T$) when projected onto DMD 110 is diffracted into one of the specific diffraction orders with relatively high diffraction efficiency since a short pulse of light duration causes the DMD mirrors to appear to be in frozen state in a particular state that is equivalent to a blazed grating where the slope of the mirror is set to the blaze angle. Typically, all mirrors in the array onto which the light is projected are controlled to be actuated to a same degree (i.e., they have the same blaze angle); however, in some embodiments, only a subset of mirrors (e.g., at least 90% or at least 80% or at least 50% or at least 25%) are controlled to be actuated to a same degree.

The number of diffraction orders that can be fully generated for a given setup, $N_{Max}$, is a function of: wavelength ($\lambda$), mirror pitch (p), maximum mirror tilt angle ($\alpha$), and angle of incidence on DMD ($\beta$). The maximum number of scan spots is determined by the number of diffraction orders that exist between the ON angle and the OFF angle defined by the DMD's maximum tilt angle of the micromirrors (or a selected first state and second state). If the DMD mirrors have rotation angles of +/−$\alpha$, then the reflected beam has a maximum deflected angle of +/−$2\alpha$. The larger $\alpha$ is, the more scan spots that are possible. As shown by Equation 2, the grating equation can be used to determine the angles of diffraction possible if $\lambda$, p, and $\beta$ are given. For a diffraction order, m, the diffraction angle from the $0^{th}$ order is given as $\theta_m$.

$$\theta_m = \arcsin\left(\frac{2m\lambda}{p} - \sin(\beta)\right) + \beta \qquad (2)$$

Thus, if $\lambda$, p, $\beta$, and $\alpha$ are given, it is possible to determine $N_{Max}$ using Eq. 3 below. The function "floor" operates to round $N_{Max}$ down to the nearest integer.

$$N_{max} = \qquad (3)$$
$$1 + \text{floor}\left|\frac{p[\sin(2\alpha - \beta) + \sin(\beta)]}{2\lambda}\right| + \text{floor}\left|\frac{p[\sin(-2\alpha - \beta) + \sin(\beta)]}{2\lambda}\right|$$

As indicated above, $N_{max}$ is the number of diffraction orders that can be fully transmitted (i.e., the transmission is not truncated, for example, by the angle of the tilt angle of the DMD) by a given setup. It is to be appreciated that 100% or near 100% transmission may be desirable for some order in some embodiments, in other embodiments, it may be possible or desirable to use diffraction orders where less than 100% transmission is possible.

Example 1—Discrete Beam Steering of Plane Wave

An experimental setup for steering a plane wave according to aspects of the present invention is discussed with reference to FIG. 1, where source 120 is an 8 ns, 905 nm laser diode (e.g., part number L59-220-8-S10-00 from Laser Components of Munich, Germany). The laser pulse is collimated by a 20× and NA 0.4 microscope objective lens 140 (e.g., part number 80.3071 from Rolyn Optics) and directed toward the DMD surface at an incident angle of 30 degrees.

The driver for DLP3000 contains an external trigger port that may be used to switch the mirror array between the ON and OFF states by displaying an all-white or all-black bitmap image. Both the DMD driver and light source 120 are controlled by a processor 130 (e.g., microcontroller Arduino Uno, Arduino of Italy). The trigger signal sent to light source 120 may be delayed by delay line 150 to synchronize the laser pulse from light source 110 with the movement of the micromirrors in DMD 120.

Figure 4:
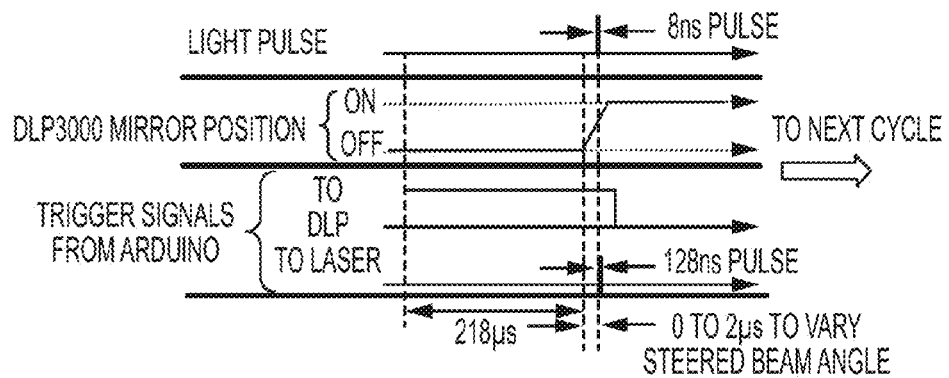
FIG. 4 shows an example of a timing diagram for operation of a beam steering apparatus.

For example, a desired delay time for the trigger to the light source relative to the trigger input to actuate the micromirrors can be measured experimentally. In one instance, the micromirrors start transitioning about 218 µs after the external trigger pulse is sent to the DMD driver and takes about 2 µs to complete transitioning. An example of a timing diagram for operation of beam steering apparatus 100 is depicted in FIG. 4. In some embodiments, a serially programmable timing element 150 (e.g., part number DS1023 from Dallas Semiconductor of Dallas, Tex.) between processor 130 and light source 120 is added to provide a programmable delay from 0 to 64 ns in 0.25 ns increments to allow processor 130 to introduce a time delay to the signal sent by processor 130 to light source 120 to finely tune the activation of the micromirrors.

Figure 5A:
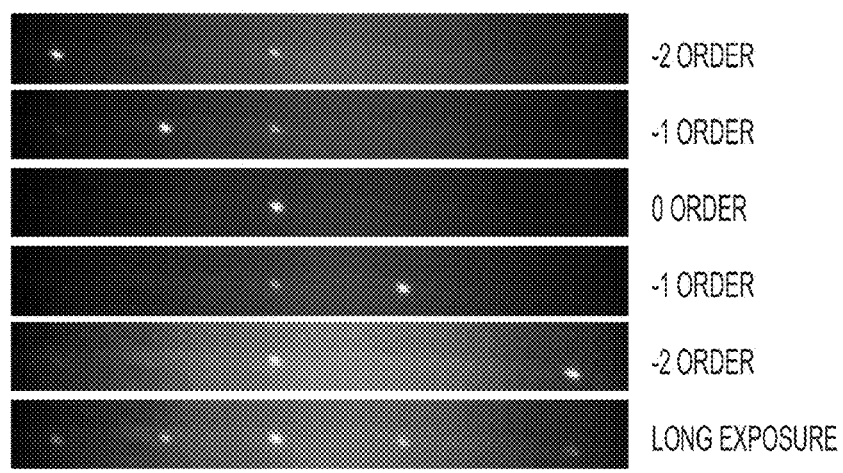
FIG. 5A shows a series of six captured images each corresponding to one of five discrete diffraction orders (−2, −1, 0, +1 and +2) and a long exposure picture showing all orders at once.

FIG. 5A shows a series of six captured images each corresponding to one of five discrete diffraction orders (−2, −1, 0, +1 and +2) and a long exposure picture showing all orders at once while the beam is scanned over the five diffraction orders. These images were captured with a CMOS camera (part no. DCC1545M-GL from Thorlabs of Newton, N.J.) and an infrared lens (part no. 12VM1040ASIR from Tamron of Saitama, JP) by imaging a viewing screen 160 placed 250 mm away from DMD 110.

Example 2—Discrete Beam Steering with Light Emitting Diode Illumination

It was determined by the inventors that, since diffraction dominates the performance of DMD beam steering, quasi monochromatic and incoherent light sources are also usable as light source 120. In the embodiment of the present example, light source 120 is a green LED (part no. L-7113GT from Kingbright of Taipei, TW) modulated and synchronized to the movement of the DMD mirrors as described above in Example 1.

Figure 5B:
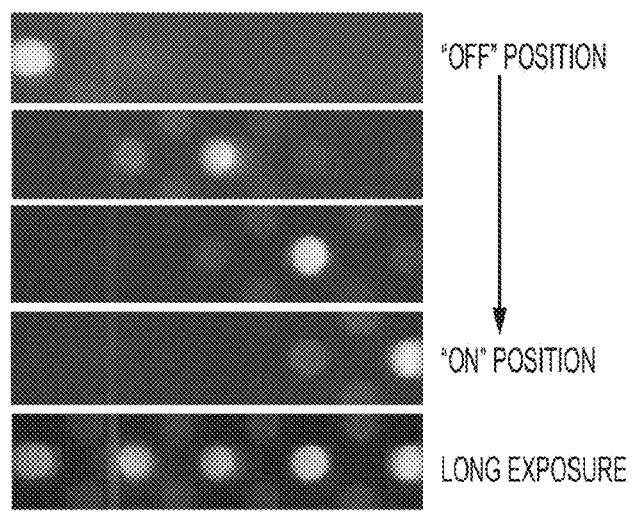
FIG. 5B shows a series of five captured images each corresponding to one of four discrete diffraction orders, and a long exposure picture showing all orders at once.

FIG. 5B shows a series of five captured images each corresponding to one of four discrete diffraction orders, and a long exposure picture showing all orders at once while the beam is scanned over the four diffraction orders. It will be appreciated that the LED used was not collimated to the degree of the laser used in plane wave illumination of Example 1, which results in larger spot sizes. It will also be appreciated that, even with larger scan spots, beam steering by using LED light is achievable.

Example 3—Continuous Beam Steering with Focused Laser Illumination

With a collimated laser or quasi collimated LED light source as described in Examples 1 and 2, continuous scanning across a field of view is not possible due to the diffraction effects of the relatively small DMD micromirrors as compared to the beam size of the light output from light source 120. By contrast, in the present example, a single DMD micromirror of DMD 110 is illuminated with pulses of light from light source 120. In this example, light source 120 is a nanosecond pulsed light source of 532 nm laser light (Vector 532-1000-20 from Coherent of East Hanover, N.J.). The laser was focused by a microscope objective 140 (part number 20× from Swift Optical Instruments of Schertz, Tex.). DMD 110 and light source 120 were controlled with similar synchronizing electronics as described above with Examples 1 and 2. Due to the projection of light from source 120 onto a single micromirror, the diffraction effects of the DMD no longer dominate the light pattern output from DMD 110.

Figure 5C:
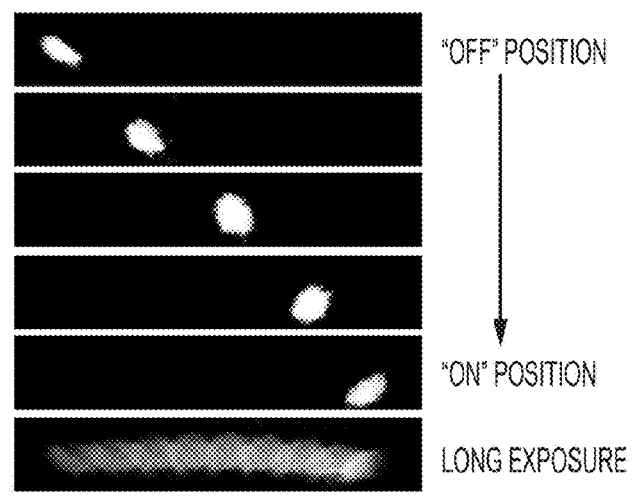
FIG. 5C shows a series of six captured images corresponding to a progression of horizontal scans as the DMD is actuated.

Similar to Example 1, FIG. 5C shows a series of six captured images corresponding to progression of horizontal scans as the DMD is actuated. FIG. 5C illustrates the light output of five discrete micromirror tilt positions between an OFF position and an ON position, and a long exposure. FIG. 5C shows the ability of DMD 110 to achieve many beam steering states between the OFF position and the ON position of DMD 110. The steering states are determined, in part, by the pulse delay of the light output from light source 120.

Figure 6A:
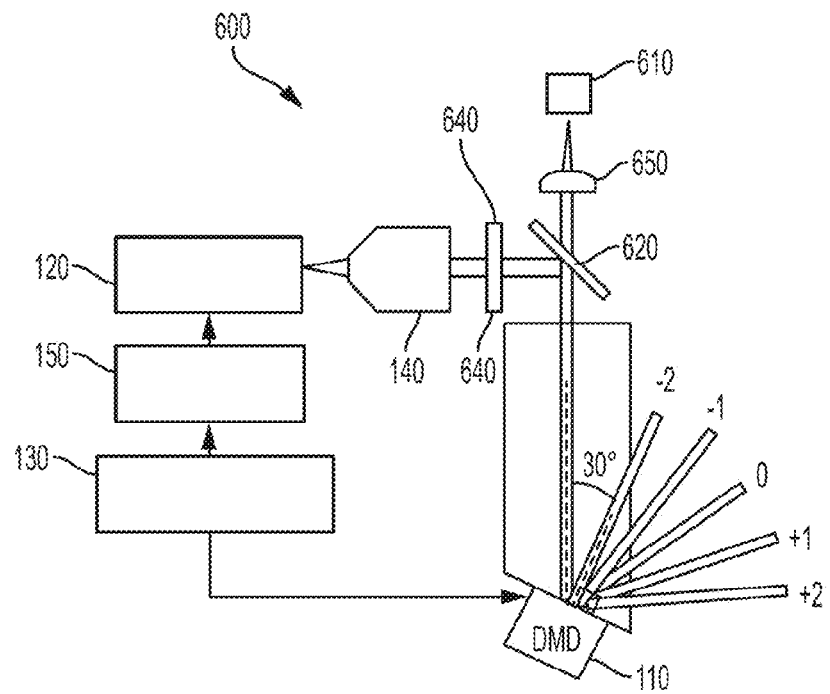
FIG. 6A is an illustration of an example of a DMD-based beam steering apparatus as described herein integrated into a 1D line scanning LIDAR system.

The inventors have determined that techniques of beam steering using pulsed beams, as described herein, are well suited for LIDAR systems based on a Time of Flight (TOF) measurement. As schematically illustrated in FIG. 6A, a DMD-based beam steering apparatus as described herein may be integrated into a one-dimensional (1D) line scanning LIDAR system 600. Employing a beam steering system as described herein, LIDAR system 600 makes TOF measurements along each of five diffraction orders within the DMD's field of view (e.g., 48 degrees). Although the LIDAR system is described with reference to five orders of diffraction, a greater number of orders may be generated (as set for below) and used, or a non-diffractive system as described in Example 3 above may be used.

To make TOF measurements, a detector 610 (e.g., an avalanche photodiode (APD) (e.g., part no. C12702 from Hamamatsu of JP)) and fold mirror 620 may be added to the optical setup of FIG. 1. As illustrated, the laser pulses may travel from the collimating objective 140 through an adjustable aperture 640 and be directed by a fold mirror 620 onto the DMD 110 at a 30° incident angle. The reflected light retraces this path through the DMD 110 to detector 610. An optional focusing lens 650 may be used to focus light on the detector 610. It is noted that, while this example uses a time-of-flight (TOF) range finding scheme, other range finding schemes can be used by varying the source and detector programming in the processor. Some other examples of range finding schemes include frequency modulation, coded waveforms, heterodyne detection, and gated capture.

Figure 6B:
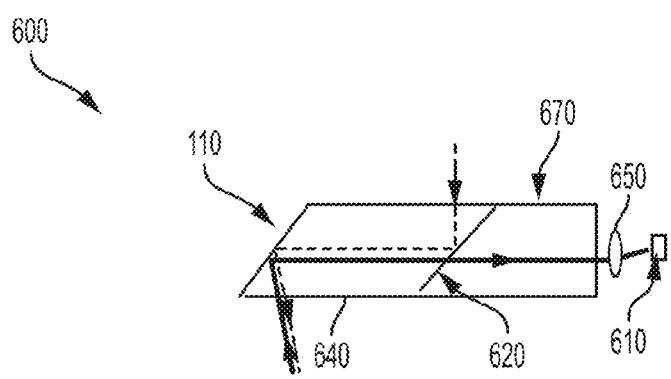
FIGS. 6B and 6C show structure and operation of one embodiment of a mount for use in a LIDAR system.
Figure 6C:
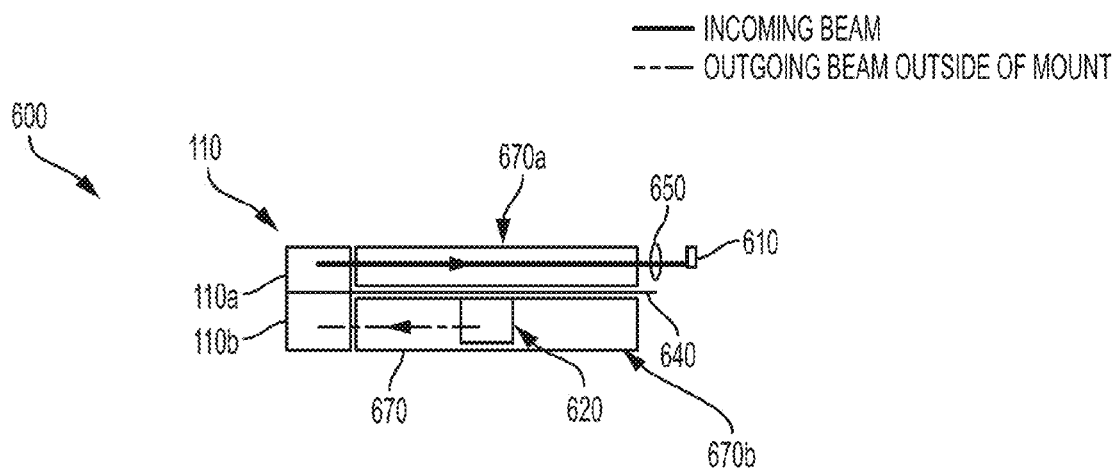

FIGS. 6B and 6C are top and side views, respectively, of an embodiment of a LIDAR system 600, including a mount 670 configured to reduce cross talk between transmitting and receiving optical paths. Mount 670 holds detector 610, fold mirror 620, and DMD 110 in such a way that allows outgoing pulses to be spatially isolated from detector 610, but still allows incoming pulses to be detected.

The mount 670 is used to help ensure that the detector 610 does not detect the outgoing beam when it is launched from the LIDAR system. Mount 670 spatially separates the outgoing and incoming laser pulses on the DMD into an upper half 670a and a lower half 670b. In the illustrated embodiment, mount 670 is made up of two halves with a sheet of metal foil 640 extending through the cavity formed by the halves. As a result, the operative DMD is optically divided into an upper half 110a and a lower half 110b. In the illustrated embodiment, the outgoing pulse is incident only on the lower half of the DMD. The incoming pulse is incident on the entire surface of the DMD, but only the portion of the incoming pulse that hits the upper half of the DMD reaches detector 610.

Figure 7:
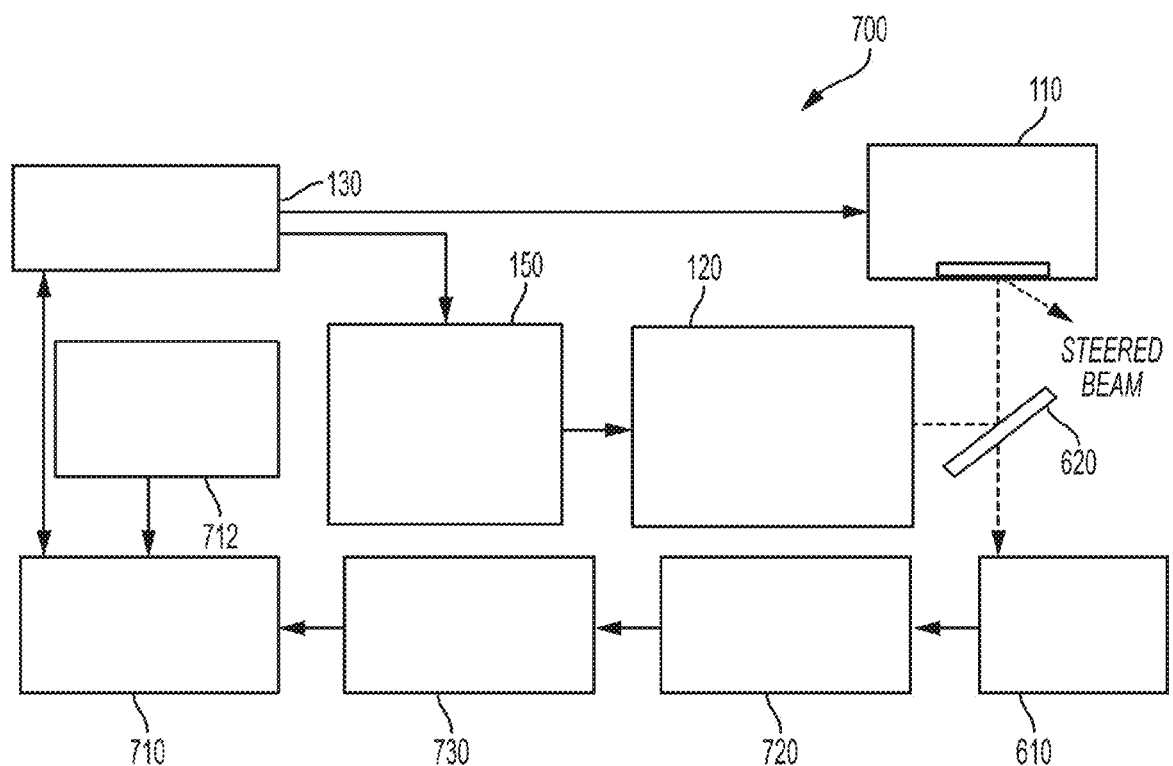
FIG. 7 is a block diagram of an example of an electronic circuit for a LIDAR system.

FIG. 7 is a block diagram 700 of an example of an electronic circuit for LIDAR system 600 (shown in FIG. 6). A time-to-digital converter 710 (e.g., part no. TDC7200 from Texas Instruments), having an oscillator 120 input, was used to measure the TOF of each pulse. The rising edge of the trigger pulse from processor 130 to the light source was the "start" signal and the rising edge of the electrical response of detector 610 was the "stop" signal. Signal processing components (e.g., preamplifier 720 and comparator 730) may be used prior to digitization.

After a TOF measurement is made, the data may be retrieved, for example, through a serial interface and transferred to processor 130. The data may be sent through a serial monitor of processor 130 for real time data collection. Alternatively, for off-line and faster data collection, the data may be sent to a static random access memory 640 (SRAM) chip (part no. 23LC1024, Microchip of Chandler, Ariz.)(not shown) via serial peripheral interface (SPI). The SPI interface was used because much higher data transfer rates could be achieved compared to the processor's serial monitor. The processor serial monitor allows data points to be read at a 433 Hz rate whereas saving data points to the SRAM via the SPI interface allows data points to be saved at a speed of 3.34 kHz.

It is to be appreciated that the number of scan angles emerging from DMD 110 in a diffractive system may be increased in many ways. For example, the number of scanning angles can be increased by employing a DMD having a larger micromirror pitch. For example, the Texas Instruments model DLP9500 DMD has a 15.3 μm corner to corner pixel pitch which produces seven horizontal diffraction orders using 905 nm light at a 30° incident angle. Also, a shorter wavelength of light from light source 120 may be used to increase the number of scan angles. Additionally, as described below with reference to FIGS. 9A and 9B, rather than a single DMD, multiple DMDs may be cascaded.

In some embodiments, light source 120 (shown in FIG. 1 or 6) is a light source that produces two or more discrete wavelengths of light. For, example, the light source may comprise a laser that produces two wavelengths of light (e.g., light at 905 nm and 1550 nm). It will be appreciated that the diffraction orders produced by two wavelengths may be non-uniformly spaced across a field of view.

Figure 8:
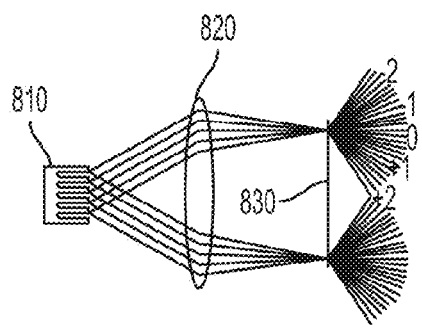
FIG. 8 shows multiple beams directed at a DMD where an upper beam and a lower beam form multiple beams.

FIG. 8 is a schematic illustration of an alternative technique for increasing the number of scanning angles of LIDAR systems as described herein is implemented using multiple arrayed light sources (rather than a single light source 120). Each laser of the array 810 is collimated by the collimating lens 820 and is incident on a DMD 830 at a different angle. Typically the array of lasers includes lasers that produce the same wavelength of light as one another. In some embodiments, the array of lasers includes lasers that produce different wavelengths than one another.

A sample analysis of a system using multiple light sources as in FIG. 8 is given below. The analysis is given by way of example and is not limiting of the arrays that are within the scope of aspects of the present invention. For example, assuming the DMD surface with normal incidence. The angle between the $0^{th}$ and +1 diffraction order is defined as $\theta_{+1}$ in Eq. (4). Note that a factor of 2 included in the expression which is used if the DMD has diamond-shaped pixels, such as part nos. DLP3000.

$$\theta_{+1} = \arcsin\left(\frac{2\lambda}{P}\right) \quad (4)$$

where, p, is the corner to corner DMD pixel pitch, as described with reference to FIG. 2, and λ is wavelength Assuming it is desired to divide this angular space with $N_{LD}$ laser beams to increase the total scanning resolution of the system by a factor of $N_{LD}$. Beams from the light source array (e.g., lasers of a laser array) originate from a stack of $N_{LD}$ light sources placed at the back focal plane of a collimating lens. The beams are directed at the DMD, as depicted in FIG. 8, where an upper ray and a lower ray show the beams originating from each of the five lasers of the array. Also as shown, each beam is incident on the DMD at a different angle and, in the present embodiment, each gives rise to five diffraction orders (i.e., there is a total of 25 beams, each at a different angle). Although the illustrated embodiment has 5 lasers in the array, a different number could be present; and although each beam gives rise to 5 orders (each set of five orders is angularly offset relative to the other sets of orders), as described herein a system giving rise to more or less than 5 orders can be achieved.

Assuming that the maximum spatial extent of the laser diode stack is $$\pm \frac{N_{LD} d}{2}.$$

The output laser beams thus have a maximum angular divergence of $$\pm \frac{\theta_{+1}}{2}.$$

These two quantities are related by Eq. (5), where d is the laser diode pitch.

$$\frac{\theta_{+1}}{2} = \arctan\left(\frac{N_{LD} d}{2} \frac{1}{f_{col}}\right) \quad (5)$$

The DMD is assumed to have an area of $A_{rec}$, thus the maximum linear dimension of the DMD is proportional to $\sqrt{A_{rec}}$. It is assumed that the collimating lens has a numerical aperture of $NA_{col}$ and that the DMD area is completely illuminated. The focal length of the collimation lens, $f_{col}$, can thus be described by Eq. (6).

$$f_{col} = \frac{\sqrt{A_{rec}}}{2} \sqrt{\frac{1}{NA^2} - 1} \quad (6)$$

Combining Eq. (4) and Eq. (5) allows us to create an equation describing the maximum possible number of light sources as a function of $NA_{col}$, $A_{rec}$, and $\theta_{+1}$, as shown in Eq. (7).

$$N_{LD} \cong \tan\left(\frac{\theta_{+1}}{2}\right) \frac{\sqrt{A_{rec}}}{2} \sqrt{\frac{1}{NA_{col}^2} - 1} \quad (7)$$

$A_{rec}$ is an related to the maximum measurable range, R, and is given by Eq. (8). $E_T$ and $E_S$ are the transmitted and received powers respectively, $A_{ilm}$ is the area of the illumination spot, σ is the cross sectional area of the object being detected, and α is the reflectivity of the object. The transmission of the atmosphere and the system are given as $\eta_{atm}$ and $\eta_{sys}$, respectively.

$$R = \sqrt{\frac{E_T}{E_S} \frac{\sigma}{A_{ilm}} \frac{A_{rec}}{\pi} \alpha(\eta_{atm}^2 \eta_{sys})} \quad (8)$$

The energy received by the APD, given as $E_S$, being replaced with the photosensitivity of the detector, S, by using $$E_S \propto \frac{1}{S},$$

thus arriving at Eq. (9).

$$R \cong \sqrt{E_T S \frac{\sigma}{A_{ilm}} \frac{A_{rec}}{\pi} \alpha(\eta_{atm}^2 \eta_{sys})} \quad (9)$$

The maximum point scan rate of a DMD-based LIDAR system is equal to the pattern refresh rate of the specific DMD used multiplied by the number of laser pulses occurring during a given transition from the ON to OFF states. The line scan rate will be defined as the pattern refresh rate multiplied by the number of laser pulses occurring during a given transition from the ON to OFF states ($N_{PPT}$), then divided by the total number of points within the scan field of view, which is equal to the number of laser diodes, $N_{LD}$, times the number of diffraction orders supported by the DMD at the current wavelength used, $N_{Order}$, as shown in Eq. (10).

$$LineScanRate = \frac{PatternRefreshRate * N_{PPT}}{N_{LD} N_{Order}} \quad (10)$$

For example, two light sources (e.g., lasers) producing light having wavelengths 905 nm light and 1550 nm, respectively, may be used with the light incident on a first DMD at about a 30° angle. It is to be appreciated that 905 nm light, alone, produces 5 scan angles, and 1550 nm light, alone, produces 4 scan angles. However, with both wavelengths, there are 9 scan angles (assuming the light sources are angularly offset to avoid overlap of the zeroth orders or any other orders). It will be appreciated that, due to difference in the angular separation of diffraction orders of different wavelengths, the scan angles will not be uniformly distributed across the field of view.

Figure 9:
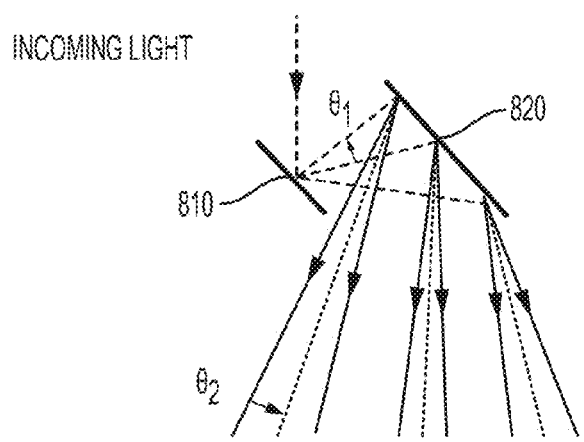
FIG. 9 is a schematic illustration depicting the technique of using multiple cascaded DMDs (in place of a single DMD) to increase the number of scan angles.

FIG. 9 is a schematic illustration depicting the technique of using multiple cascaded DMDs (in place of single DMD 110) to increase the number of scan angles. As illustrated, the technique includes having two DMDs placed next to each other so that the beam steered from first DMD 810 (e.g., DMD 110 in FIG. 1 or 6) is then steered onto second DMD 820. It is to be appreciated that the number of total scan angles resulting from such a configuration is the number of angles of the generated by first DMD 810 multiplied by the number of scanning angles generated by second DMD 820.

DMD 810 first steers the beam into one of three diffraction angles. The angle between these diffraction orders is $\theta_1$. The output of DMD 810 is then steered again by DMD 820. In the illustrated example, the second DMD (which may or may not be the same as the first DMD) is also able to steer the beam into one of three diffraction angles where the angle between these diffraction orders is $\theta_2$. In the above instance, $$\theta_2 = \frac{\theta_1}{3},$$

but it is also possible to have other configurations. One such configuration occurs when DMD 810 and DMD 820 are configured such that $\theta_2 = 3*\theta_1$.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A beam steering apparatus, comprising:
   a first actuatable micromirror array (AMA) having a pitch, p, adapted to impart a modulation to a wavefront incident on the first AMA by a transition between a first state and a second state, wherein the first AMA has a transition time (T) between the first state and the second state; and
   at least one light source adapted to provide the incident wavefront having a duration, $t_{max}$, to the first AMA, where $t_{max} \leq T$;
   wherein
   $t_{max} \leq T/N_{Max}$,
   where $N_{Max}$ is the number of diffraction orders of the incident wavefront supported by the AMA, and is given by, $$N_{max} = 1 + floor\left|\frac{p[\sin(2\alpha - \beta) + \sin(\beta)]}{2\lambda}\right| + floor\left|\frac{p[\sin(-2\alpha - \beta) + \sin(\beta)]}{2\lambda}\right|$$

where $2\alpha$ is the phase tilt angle induced by the first AMA for a normal incident wavefront, $\beta$ is the in-plane angle of incidence of the incident wavefront along which phase is modulated, $\lambda$ is the wavelength of light from the at least one light source, and the function 'floor' rounds $N_{Max}$ down to the nearest integer,
   further wherein the first AMA functions as a blazed grating according to the equation $$\theta_m = \arcsin\left(\frac{2m\lambda}{p} - \sin(\beta)\right) + \beta,$$

where $\theta_m$ is a diffraction angle supported by said blazed grating, and m is the diffraction order.

2. The beam steering apparatus of claim 1, wherein the first state and second state are discrete ON and OFF states, respectively.

3. The beam steering apparatus of claim 1, wherein the at least one light source comprises a laser.

4. The beam steering apparatus of claim 1, wherein the at least one light source comprises a plurality of laser diodes.

5. The beam steering apparatus of claim 1, wherein the at least one light source comprises a plurality of light sources producing at least two different wavelengths.

6. The beam steering apparatus of claim 1, wherein the incident wavefront is planar.

7. The beam steering apparatus of claim 1, wherein the at least one light source is configured to produce collimated light.

8. The beam steering apparatus of claim 1, wherein the at least one light source is configured to produce quasi-collimated light.

9. The beam steering apparatus of claim 1, wherein the first AMA has only 2 discrete states of operation.

10. The beam steering apparatus of claim 1, further comprising a second AMA cascaded with the first AMA to receive light from the incident wavefront after is incident on the first AMA.

11. A method for making an effective blazed grating, comprising:
   actuating an actuatable micromirror array (AMA) array between a first state and a second state, wherein the AMA has a transition time, T between the first state and the second state; and
   directing a wavefront onto the AMA, the wavefront having a duration t,
   where $t_{max} \leq T$, wherein where $t_{max} \leq T$, wherein
where $N_{Max}$ is the number of diffraction orders with diffraction efficiency equal to or greater than 50% of the incident wavefront supported by the AMA, wherein the AMA functions as a blazed grating according to the equation $$\theta_m = \arcsin\left(\frac{2m\lambda}{p} - \sin(\beta)\right) + \beta,$$

where $\theta_m$ is the diffraction angle(s) supported by said blazed grating, $\lambda$ is the wavelength of the incident wavefront, and m is the diffraction order, $\beta$ is in-plane angle of incidence of incident wavefront along which phase is modulated.

12. A LIDAR system for detecting an object, comprising:
a first actuatable micromirror array (AMA) having a pitch, p, adapted to impart a modulation to a wavefront incident on the first AMA by a transition between a first state and a second state, wherein the first AMA has a transition time (T) between the first state and the second state;
at least one light source adapted to provide the incident wavefront having a maximum duration, $t_{max}$, to the first AMA, where $t_{max} \leq T$; and
a detector positioned to receive light from the wavefront after it is directed onto the object,
wherein
$t_{max} \leq T/N_{Max}$,
where $N_{Max}$ is the number of diffraction orders of the incident wavefront supported by the AMA, and is given by, $$N_{max} = 1 + \text{floor}\left|\frac{p[\sin(2\alpha - \beta) + \sin(\beta)]}{2\lambda}\right| + \text{floor}\left|\frac{p[\sin(-2\alpha - \beta) + \sin(\beta)]}{2\lambda}\right|$$

where $2\alpha$ is the phase tilt angle induced by the first AMA for a normal incident wavefront, $\beta$ is the in-plane angle of incidence of the incident wavefront along which phase is modulated, $\lambda$ is the wavelength of light from the at least one light source, and the function 'floor' rounds NMax down to the nearest integer, further wherein the first AMA functions as a blazed grating according to the equation $$\theta_m = \arcsin\left(\frac{2m\lambda}{p} - \sin(\beta)\right) + \beta,$$

where $\theta_m$ is a diffraction angle supported by said blazed grating, and m is the diffraction order.

13. The LIDAR system of claim 12, wherein the first state and second state are discrete ON and OFF states, respectively.

14. The LIDAR system of claim 12, wherein the at least one light source comprises a laser.

15. The beam steering apparatus of claim 12, wherein the at least one light source comprises a plurality of light sources producing at least two different wavelengths.

16. The beam steering apparatus of claim 12, wherein the at least one light source is adapted to produce collimated light.

17. The beam steering apparatus of claim 12, wherein the first AMA has only 2 discrete states of operation.

* * * * *